(12) United States Patent
Massey et al.

(10) Patent No.: US 11,624,267 B2
(45) Date of Patent: Apr. 11, 2023

(54) FLEXIBLE PIPE CONNECTION SYSTEMS AND METHODS

(71) Applicant: FMC Technologies, Inc., Houston, TX (US)

(72) Inventors: Corey Massey, Houston, TX (US); John Eden, Houston, TX (US); Julian Keihany, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 40 days.

(21) Appl. No.: 17/091,999

(22) Filed: Nov. 6, 2020

(65) Prior Publication Data

US 2022/0145733 A1    May 12, 2022

(51) Int. Cl.
*E21B 43/12* (2006.01)
*F16L 41/02* (2006.01)

(52) U.S. Cl.
CPC .............. *E21B 43/12* (2013.01); *F16L 41/02* (2013.01)

(58) Field of Classification Search
CPC .................................. E21B 43/12; F16L 41/02
See application file for complete search history.

(56) References Cited

U.S. PATENT DOCUMENTS

| | | | | |
|---|---|---|---|---|
| 8,469,108 | B2* | 6/2013 | Kajaria | E21B 43/26 166/380 |
| 10,480,300 | B2* | 11/2019 | Guidry | E21B 43/26 |
| 2010/0032031 | A1* | 2/2010 | Neal | E21B 21/02 166/381 |
| 2013/0284455 | A1* | 10/2013 | Kajaria | E21B 43/26 166/79.1 |
| 2017/0314379 | A1* | 11/2017 | Guidry | E21B 43/26 |
| 2020/0277845 | A1* | 9/2020 | Kajaria | E21B 43/2607 |
| 2021/0148500 | A1* | 5/2021 | Farquharson | E21B 43/2607 |
| 2021/0156240 | A1* | 5/2021 | Cicci | E21B 43/26 |
| 2021/0372548 | A1* | 12/2021 | Post | F16L 27/0849 |
| 2021/0404579 | A1* | 12/2021 | Post | F16L 19/02 |
| 2022/0018235 | A1* | 1/2022 | Post | F16L 27/0861 |

\* cited by examiner

*Primary Examiner* — Michael R Wills, III
(74) *Attorney, Agent, or Firm* — Osha Bergman Watanabe & Burton LLP (57) ABSTRACT

A system for transferring fluid from a pump to a manifold, the manifold having a plurality of fluid inlets. A first pump truck includes a first pump having a first fluid outlet. A first flexible pipe couples the first fluid outlet to a first fluid inlet. The first flexible pipe is self-supporting and forms an arch extending over the first pump truck. The first pump truck may include a second pump having a second fluid outlet and a second flexible pipe may couple the second fluid outlet to a second fluid inlet. A second pump truck may include third and fourth pumps having third and fourth fluid outlets, respectively, that may be coupled to third and fourth fluid inlets by third and fourth self-supporting flexible pipes.

19 Claims, 9 Drawing Sheets

FLEXIBLE PIPE CONNECTION SYSTEMS AND METHODS

BACKGROUND

In a well fracture system, high pressure fluids must be transmitted to a wellbore. Systems for generating sufficient pressure are complex and generally involve distributing low pressure fluid from a manifold, also referred to as a missile, to one or more pump trucks through low pressure lines. The pump trucks pressurize the fluid and return the high pressure fluid to the manifold through high pressure lines. The high pressure fluid is delivered to one or more wellbores for use in downhole operations such as fracturing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure relates to a system for transferring fluid from a pump to a manifold. The system may include a manifold having a plurality of fluid inlets and a first pump truck having first and second pumps. The first pump may include a first fluid outlet and the second pump may include a second fluid outlet. A first flexible pipe may couple the first fluid outlet to the first of the plurality of fluid inlets. A second flexible pipe may couple the second fluid outlet to the second of the plurality of fluid inlets. The first and second flexible pipes may be self-supporting and form an arch extending over the first pump truck. The system may further include a second pump truck having a third and fourth pump disposed thereon. The third pump may include a third fluid outlet and the fourth pump may include a fourth fluid outlet. A third flexible pipe may couple the third fluid outlet to a third of the plurality of fluid inlets and a fourth flexible pipe may be configured to couple the fourth fluid outlet to a fourth of the plurality of fluid inlets. The third and fourth flexible pipes may be self-supporting and may form an arch extending over a space between the second pump truck and the manifold.

In another aspect, the present disclosure relates to a system for transferring fluid to a wellbore. The system may include two or more systems for transferring fluid from a pump to a manifold and a primary manifold fluidly connected to and configured to receive fluid from each of the manifolds of the two or more systems. An outlet of the primary manifold may be fluidly connected, directly or indirectly, to the wellbore.

In another aspect, the present disclosure relates to a system for transferring fluid from a pump to a manifold. The system may include a manifold having a first fluid inlet, a pump having a first fluid outlet, and a first flexible pipe having a first end coupled to the first fluid outlet and a second end coupled to the first fluid inlet. The first fluid inlet and the first fluid outlet may be upwardly orienting and the first flexible pipe may be self-supporting between the first and second ends.

In another aspect, the present disclosure relates to a method of assembling a pumping system. The method may include locating a first pump truck and a second pump truck proximate a manifold. The first pump truck may include a first pump and the second pump truck may include a second pump disposed thereon. The method may further include connecting a first end of a first flexible pipe to a first fluid inlet of the manifold and connecting a second end of the first flexible pipe to a fluid outlet of the first pump thereby forming the first flexible pipe in a first self-supporting arch between the first and second ends. A first end of a second flexible pipe may be connected to a second fluid inlet of the manifold and a second end of the second flexible pipe may be connected to a fluid outlet of the second pump, thereby forming the second flexible pipe in a second self-supporting arch.

In yet another aspect, embodiments herein are directed toward a system for transferring fluid from a pump to a manifold. The system may include a manifold having a plurality of fluid inlets. A first pump truck may be provided, having a pump disposed thereon, the pump including a fluid outlet. The system may further include a flexible pipe fluidly coupled between the fluid outlet and a first of the plurality of fluid inlets, wherein the flexible pipe forms a downward concave arch extending over the first pump truck and/or over a space between the first pump truck and the manifold. In some embodiments, the arched flexible pipe may be self-supporting between the pump outlet and the manifold inlet.

Other aspects and advantages will be apparent from the following description and the appended claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

As used herein, the term "coupled" or "coupled to" or "connected" or "connected to" may indicate establishing either a direct or indirect connection, and is not limited to either unless expressly referenced as such.

Figure 1:
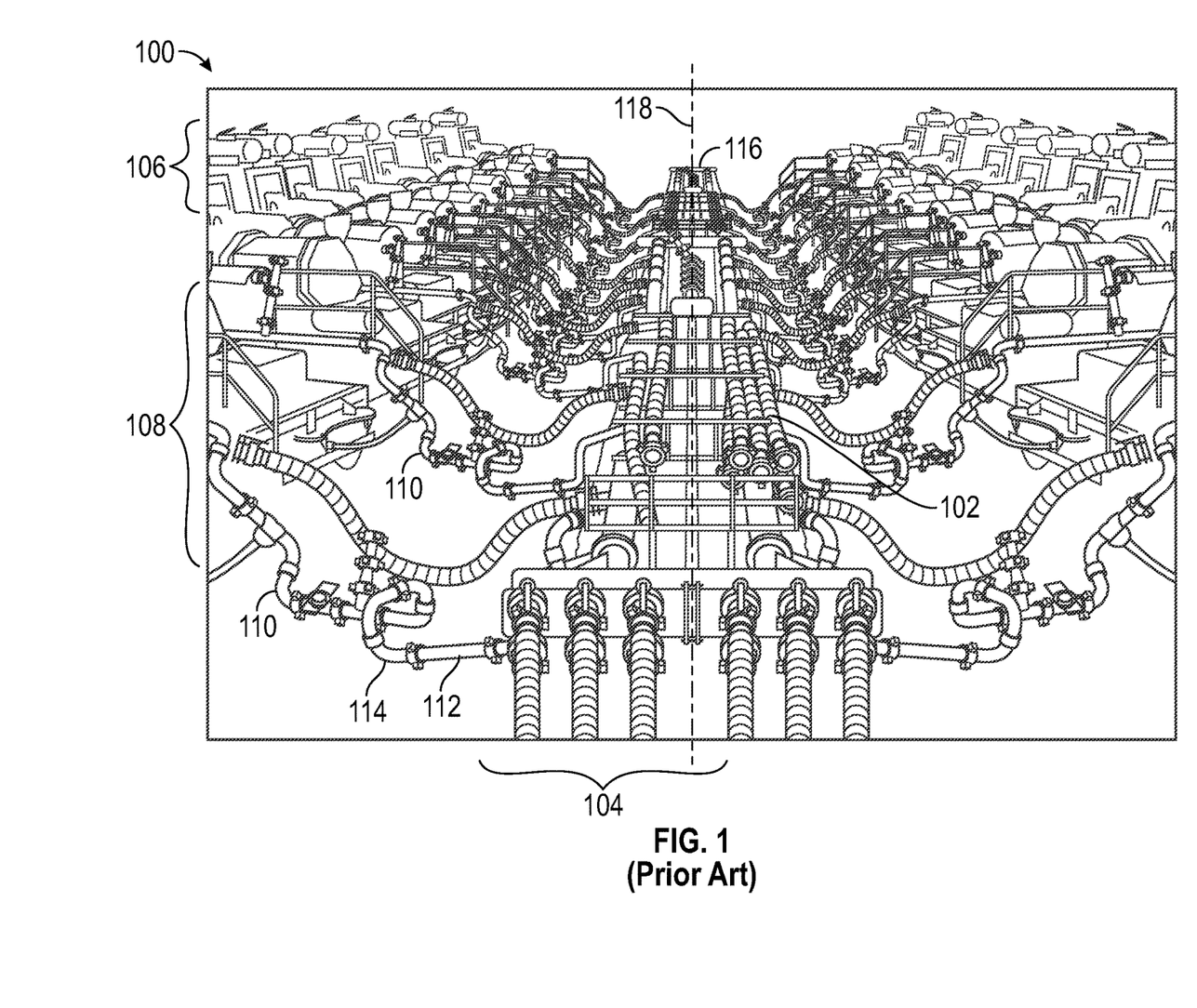
FIG. 1 is a perspective view of pumping system in accordance with the prior art.

Referring to FIG. 1, a pumping system 100 is shown. The pumping system 100 includes a pump manifold 102 with inlet lines 104 for receiving low pressure fluid into the pump manifold 102. The pump manifold 102 distributes the low pressure fluid to a plurality of pump trucks 106 through low pressure lines 108. Low pressure lines 108 are typically pipe, flexible tubing, or hose, such as formed from rubber or elastomeric material. Pumps disposed on the pump trucks 106 pressurize the fluid and return high pressure fluid to the pump manifold 102 through high pressure lines 110. The high pressure lines 110 shown are rigid pipes formed by connecting multiple straight or angled rigid pipe sections 112 using swivel joints 114. The rigid pipe sections 112 of high pressure lines 110 can be formed from a metal material so as to withstand the high pressure of the fluid moving therethrough.

The high pressure lines 110 formed from rigid pipe sections 112 can include angles and redundancies to create an indirect path between a back end of the pump trucks 106 and the pump manifold 102. Such a configuration allows for some absorption of vibrations caused by the pumps or by other equipment on board the pump trucks, such as mixing equipment. Pump trucks 106 may, for example, include mixing equipment for mixing sand with a fluid to create a mixture, often called a slurry, used to fracture the formation and prop open the fractures. Once pressurized, the high pressure fluid or slurry can be selectively delivered to a wellbore by controlling an isolation valve 116 between the pump manifold 102 and the wellbore. Vibrations, bends, and contact with the ground may cause erosion, corrosion, leaks, and other pipe failures.

Still referring to FIG. 1, at least a portion of low pressure lines 108 and high pressure lines 110 extending between the pump manifold 102 and pump trucks 106 can rest on the ground 118 in a space between the pump manifold 102 and the pump trucks 106. While this may allow for convenient assembly of the pumping system 100, the final arrangement may impede access to the pump manifold or pump trucks by cluttering walkway space. Additionally, pump trucks 106 must be parked in specific locations and orientations so that the rigid high pressure lines 110 will reach an end connection on the pump trucks 106. In some configurations, the pump trucks 106 must be substantially equidistant from each other and arranged symmetrically or in a mirrored arrangement across two sides of the pump manifold 102 defined by a center line 118.

Figure 2:
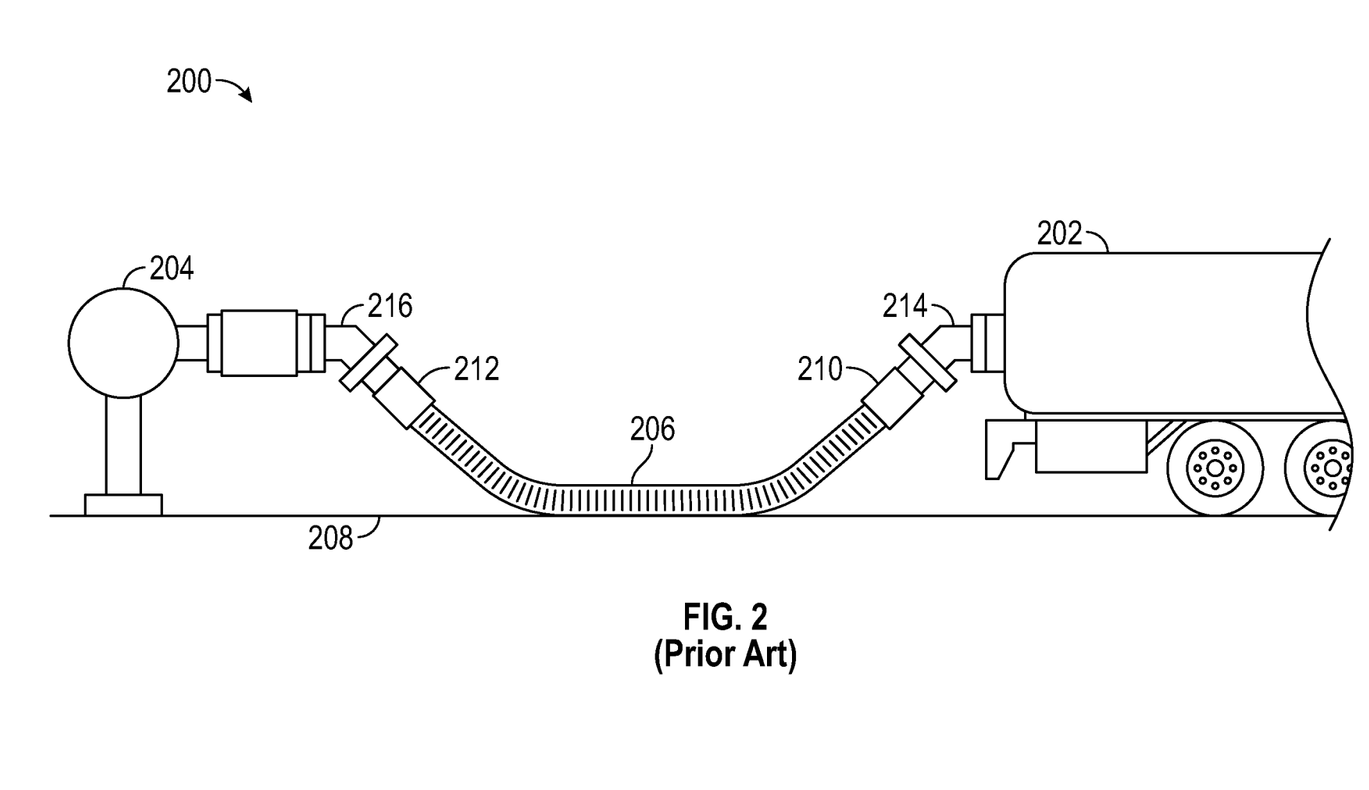
FIG. 2 is a side view of a connection system in accordance with the prior art.

FIG. 2 shows a side view schematic of a connection system 200 which uses flexible pipe to connect high pressure lines. A pump truck 202 is connected to a high pressure inlet of manifold 204 via a flexible connection line 206. A portion of the line 206 rests on the ground 208. Flexible connection line 206 includes a first end 210 and a second end 212. The first end 210 connects to a back of the pump truck 202 using a first connector 214 and the second end 212 connects to the manifold 204 using a second connector 216. First and second connectors 214, 216 can be angled downwardly to facilitate the flexible connection line 206 resting on the ground 208 and to prevent straining the material of the flexible connection line 206 by relieving high angles. In some embodiments, first and second connectors 214, 216 permit motion such as swiveling or rotating about an axis. This arrangement may place the high pressure flexible pipe in a walkway or workspace between the pump truck. Further, vibrations due to pumping may cause wear on an exterior of the pipe.

As described above, the use of rigid pipe to deliver high pressure fluids from a pump truck to a manifold provides several drawbacks, including multiple bends, pressure loss, pipe failure due to vibrations and erosion, as well as a cluttered and inaccessible workspace, not to mention the back and hand injuries to workers installing and using rigid pipe. In contrast to such configurations, it has been found that flexible pipe, suitable for delivering high pressure erosive fluids from the pumps to the manifold, when formed in a downward concave arch, may provide for efficient delivery of the high pressure fluids, reduced vibration between the pump and the manifold, reduced pressure drop, reduced leakage or failure events, and may provide a less cluttered and more accessible workspace, improving the safety of those working in and around it. Flexible pipe, as known to those skilled in the art, includes pipes having multi-layered construction providing a high pressure capacity while being flexible, and differs from hose or other low-pressure "flexible" conduits. One example of a flexible pipe useful in embodiments herein may include that described in PCT/US2019/056987, among others. The arched flexible pipe may be, for example, fluidly coupled to and disposed between a pump outlet and a manifold inlet, such as in the form of a round arch, a round-headed or stilted arch, a horseshoe arch, a rounded trefoil or cloverleaf arch, a parabolic arch, a catenary arch, an elliptical arch, or other forms of arches that may provide for a relatively smooth bending fluid pathway traversing upward from the pump outlet or a connection thereto and downward to the manifold inlet or a connection thereto. As flexible pipes are relatively stiff, compared to hose, embodiments herein may provide for the flexible pipes to be configured as a self-supporting arch fluidly connecting the pump outlet to the manifold inlet. The relative flexibility of the flexible pipe used in making the connection may influence the self-supporting capability as well as the preferred type of arch formed by the pipe and end connection angles. The use of an arched flexible pipe to span the distance from the pump outlet to the fluid inlet may provide for the flexible pipe to span over walkways, over the pump trucks themselves, or other advantageous configurations envisionable by one skilled in the art.

Referring now to FIGS. 3-7, a pumping system according to embodiments herein is shown. Pumping system 300 includes a first pump 302 disposed on a first pump truck 304. The first pump 302 includes a first fluid outlet 306 through which high pressure fluid exits the pump 302. The pumping system 300 further includes a manifold 308 having a first fluid inlet 310 for receiving high pressure fluid. A first flexible pipe 312 having a first end 314 and a second end 316 transmits high pressure fluid between the pump 302 and the manifold 308. In particular, the first end 314 connects to the first fluid outlet 306 and the second end 316 connects to the first fluid inlet 310 to allow high pressure fluid transfer therebetween. The connections between the first and second ends 314, 316 and first fluid outlet 306 and first fluid inlet 310, respectively, can include a clamp hub connection or other non-swiveling connection. In some embodiments, an angled or non-straight connection can be used to couple the flexible pipe to one or more of the first fluid outlet and the first fluid inlet.

In contrast to the pumping systems 100, 200 previously described, the first flexible pipe 312 may be essentially self-supporting between the first and second ends 314, 316 such that no portion of the first flexible pipe 312 touches the ground. As noted above, the ability of a flexible pipe to be self-supporting between the pump outlet and the manifold inlet may depend on a number of factors, including pipe variables such as the pipe flexibility, pipe diameter (inner and outer), the manufacture components of the pipe (type and arrangement of armor or reinforcing layers, etc.), among others, as well as arch variables, such as type of arch, arch radius, horizontal distance from the pump outlet to the manifold inlet, and connection angle to the pump outlet or manifold inlet, among others. Achieving an overall goal of elevating the flexible pipe may be accomplished in many embodiments without the need for additional support. Some embodiments, however, may require a support bracket, such as proximate the pump outlet or manifold inlet, to minimally support the upward/downward pipe sections, or along a horizontal-spanning section of the arch, for example, to aid in forming and maintaining the arch during use. For example, a support or support bracket may be used on or near the pump end to support the flexible connection to the pump outlet, supplementing and enabling the outlet flange or outlet connection system to be able to support the additional weight of the arched flexible pipe; the flexible pipe, however, may support the remainder of its own structure.

Figure 3:
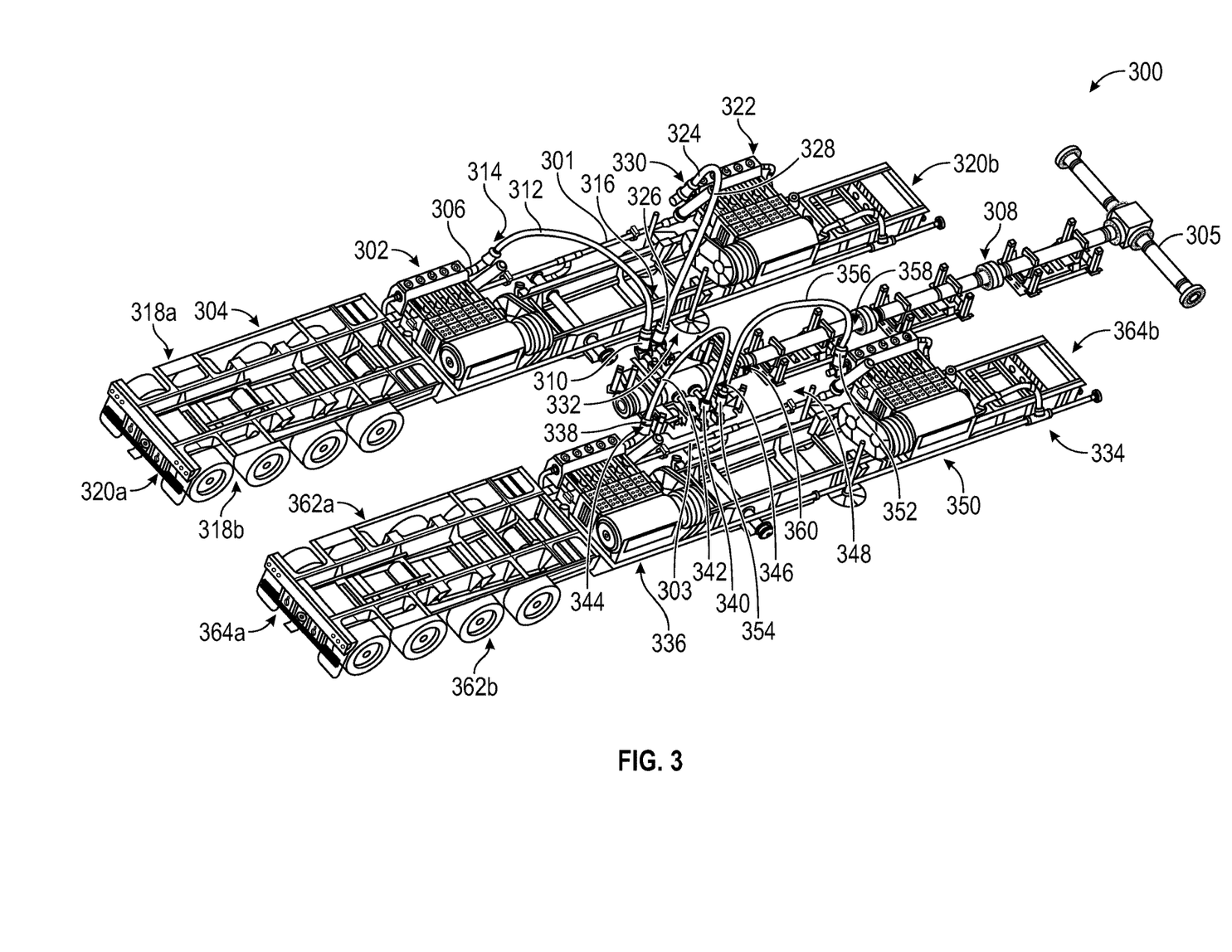
FIGS. 3-10 are pumping systems in accordance with embodiments of the present disclosure.
Figure 4:
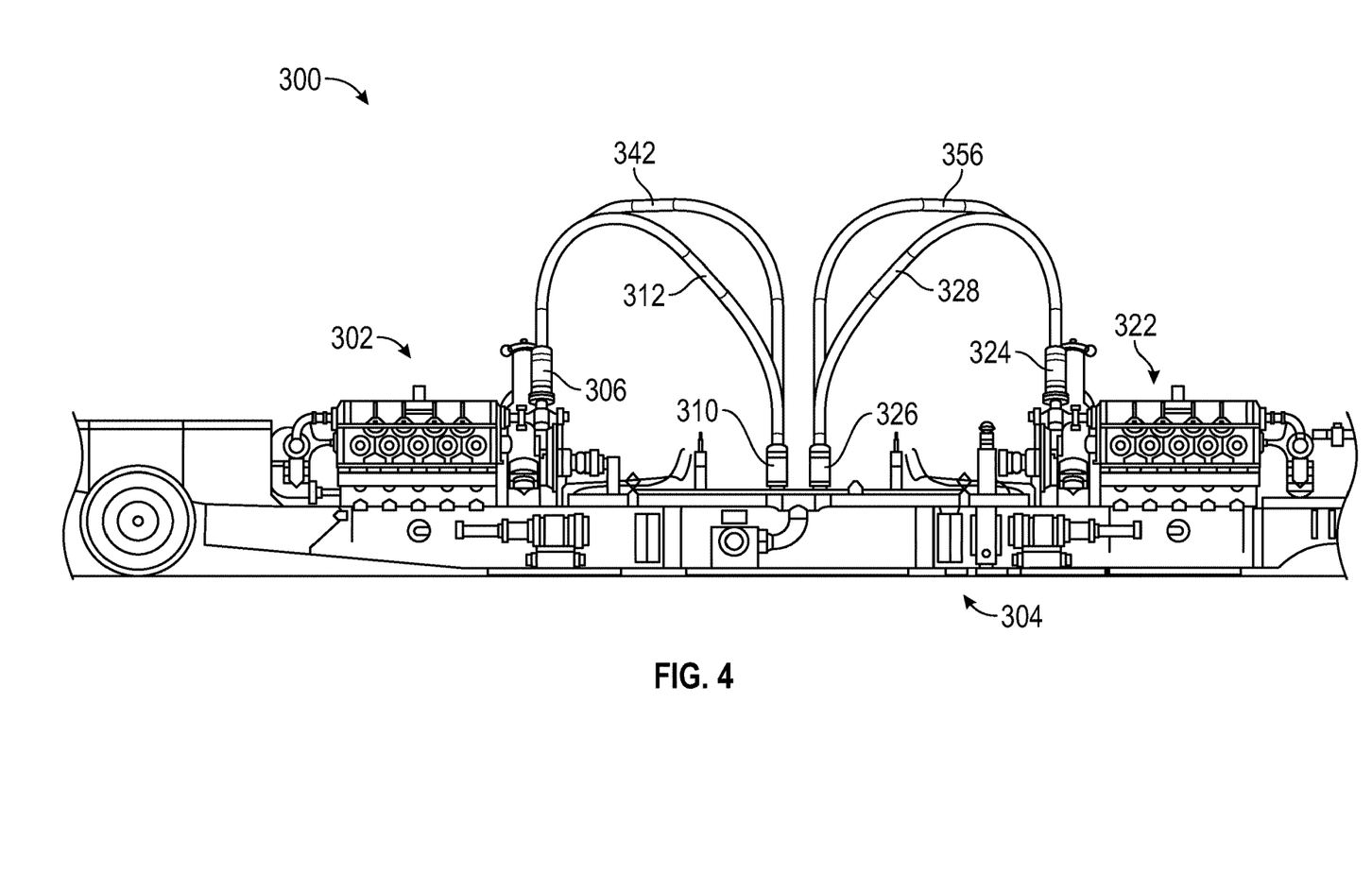
Figure 5:
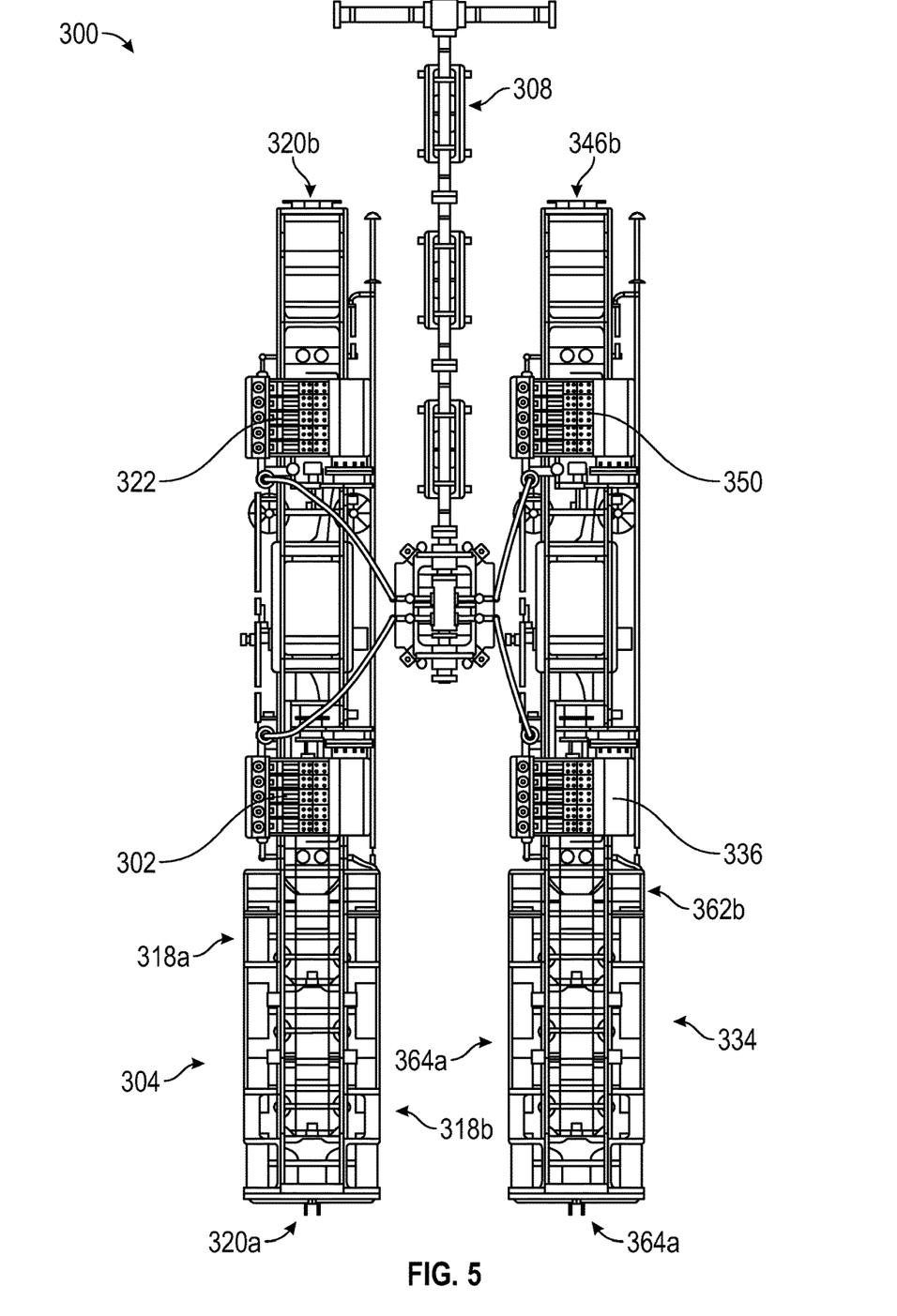
Figure 6:
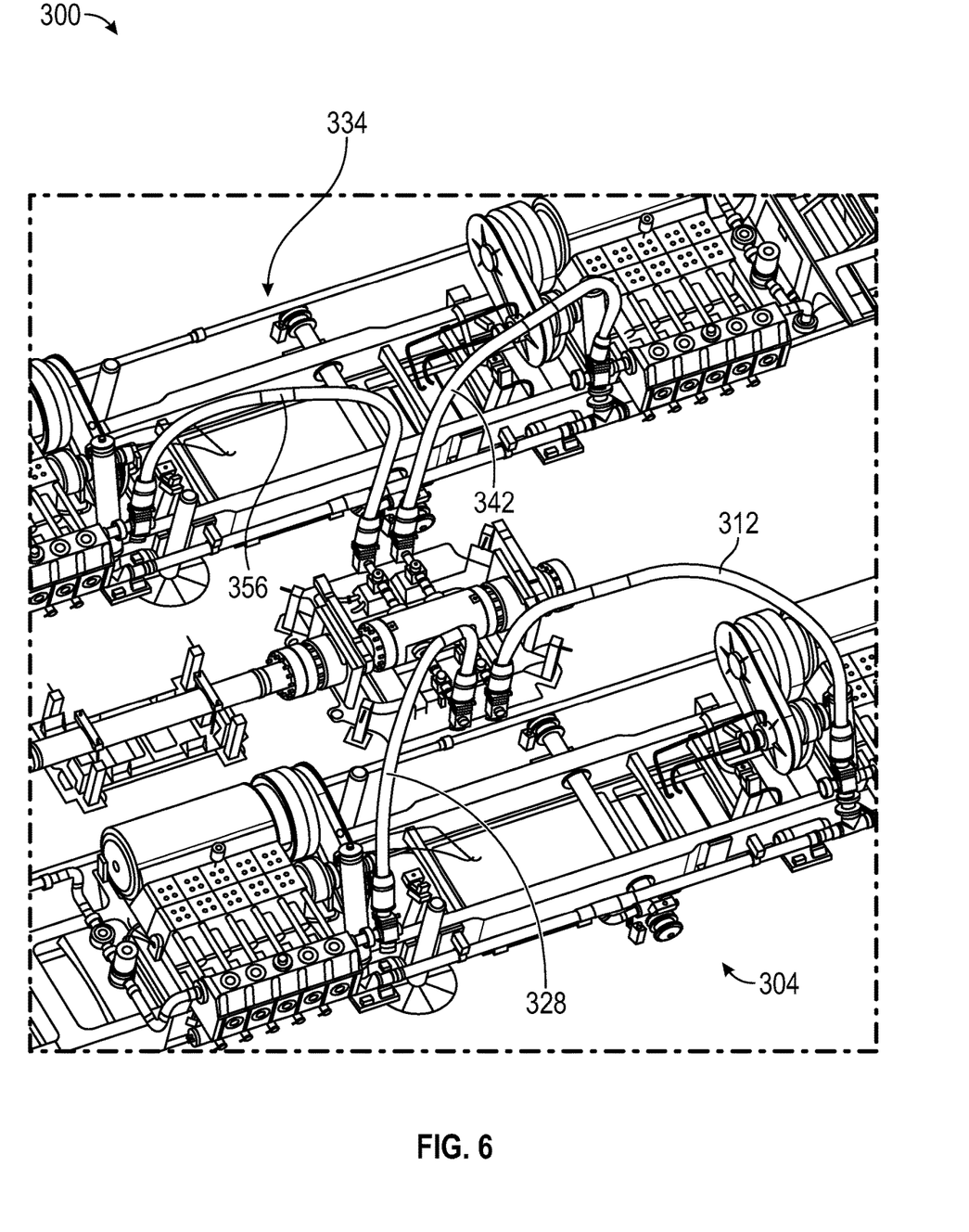
Figure 7:
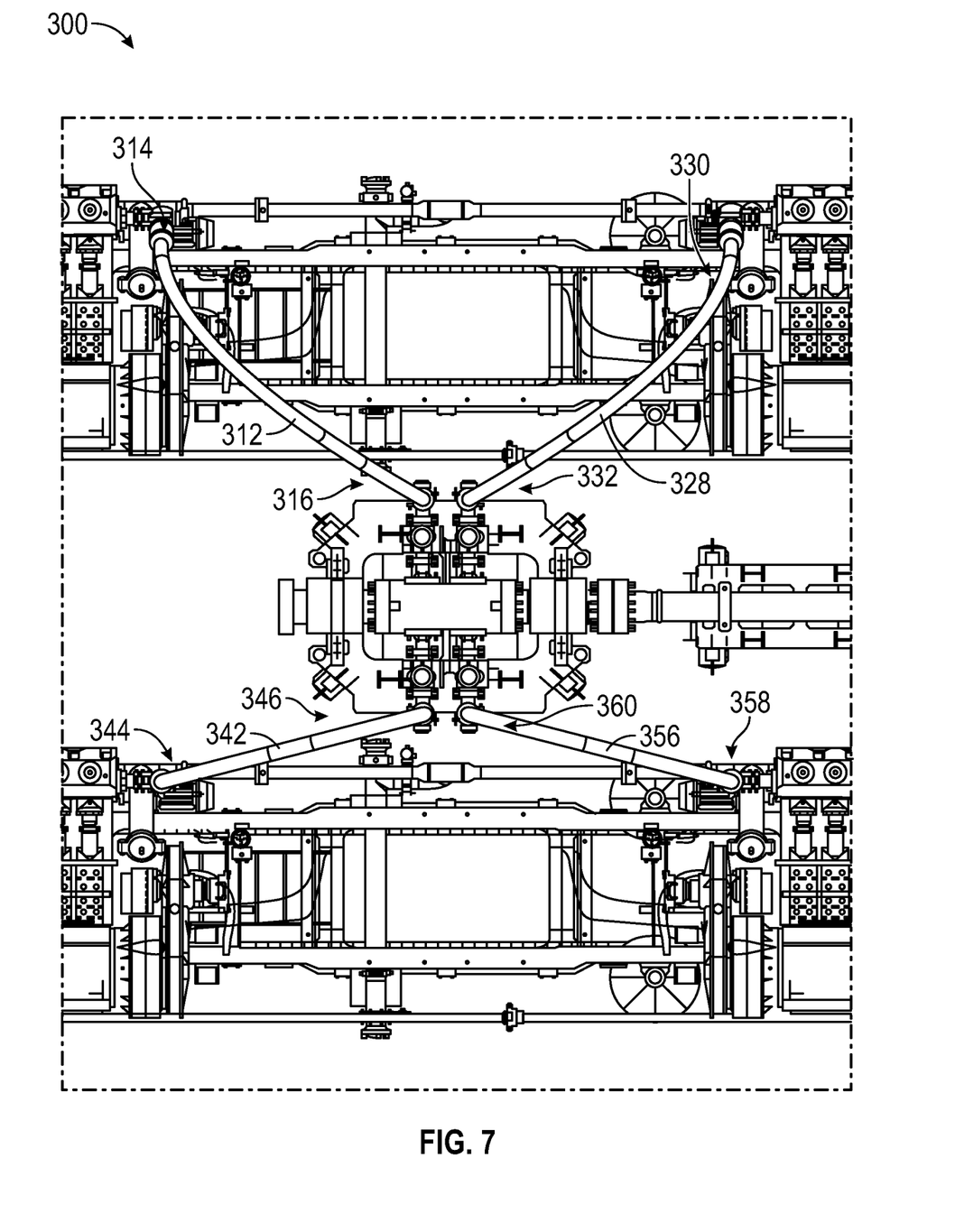

The first flexible pipe 312 can form an arch that extends upwardly from the two ends 314, 316 toward a center of the flexible pipe between the two ends. The arch of the first flexible pipe 312 can extend over the pump truck 304 as shown in FIG. 3. Thus, configurations using a self-supporting flexible pipe to connect the first fluid outlet 306 of first pump 302 to the first fluid inlet 310 of the manifold 308 can allow for new arrangements of pump trucks relative to the manifold and can allow the pump trucks to park alongside and closer to the manifold to reduce equipment footprint on site.

The pump truck 304 can include lateral sides 318*a*, 318*b* in addition to ends 320*a*, 320*b*. Ends 320*a*, 320*b* can refer to bounds of the pump truck nearest the back of the vehicle and nearest the front of the vehicle, respectively. The first fluid outlet 306 of first pump 302 can be disposed on a lateral side 318 of the first pump truck 304. In particular, the first fluid outlet 306 can be disposed on lateral side 318*a* which is furthest from the manifold 308 when pump truck 304 is parked along a left side of the manifold 308 (right side of the pump truck) as shown in FIG. 3. The first flexible pipe 312 extends from the first fluid outlet 306 on lateral side 318*a* over the pump truck 304 and other equipment disposed thereon to connect with first fluid inlet 310 on the manifold 308. The first flexible pipe 312 does not contact the ground or any other equipment between the first and second ends 314, 316.

In some embodiments, multiple pumps may be included on each pump truck. For example, as shown in FIG. 3, a second pump 322 may be included on the first pump truck 304. The second pump 322 includes a second fluid outlet 324 configured to be connected to a second fluid inlet 326 on the manifold 308 by a second flexible pipe 328. The second flexible pipe 328 includes a first end 330 and a second end 332 configured to connect to the second fluid outlet 324 and the second fluid inlet 326, respectively. The second fluid outlet 324 of second pump 322 is shown on the same lateral side 318*a* of the pump truck 304 as the first fluid outlet 306; however, other arrangements are possible where the second fluid outlet faces lateral side 318*b* or one of ends 320*a*, 320*b*. In the configuration shown, the second flexible pipe 328 is self-supporting between first and second ends 330, 332, respectively, and forms an arch extending over the pump truck 304 without touching the ground or any other equipment between the first and second ends 330, 332. First and second low pressure lines 301, 303 may transfer low pressure fluid to at least first and second pumps 302, 322, respectively.

In some fracturing operations, many pumps disposed on multiple pump trucks may be required to deliver necessary fluid pressures and volumes to a wellbore. A second pump truck 334 may be provided to increase pumping capacity to the system. The second pump truck 334 may include a third pump 336 disposed thereon. The second pump truck 334 and third pump 336 may be substantially similar to first pump truck 304 and first pump 302. The third pump 336 may include a third fluid outlet 338 which is connected to a third fluid inlet 340 on manifold 308 by a third flexible pipe 342 having a first end 344 and a second end 346. The first end 344 may connect to the third fluid outlet 338 and the second end 346 may connect to the third fluid inlet 340. The third flexible pipe 342 may be self-supporting between the two ends such that the third flexible pipe 342 does not touch the ground or any other equipment along its length.

The second pump truck 334 can include two lateral sides 362*a*, 362*b* generally extending between two ends 364*a*, 364*b* of the pump truck 334. Ends 362*a*, 362*b* can refer to bounds of the pump truck nearest the back of the vehicle and nearest the front of the vehicle, respectively. The third fluid outlet 338 of the third pump 336 may be disposed at or near a first lateral side 362*b* of the second pump truck 334 nearest the manifold 308 when the second pump truck 334 is parked along a right side of the manifold 308 as shown in FIG. 3. In such a configuration, the third flexible pipe 342 forms an arch between the first end 344 and second end 346 that spans a space 348 between the manifold 308 and second pump truck 334. In some embodiments, the space 348 may include walkways used by workers on site to access various pieces of equipment. Using self-supporting flexible pipe forming arches in the air without touching the ground or other equipment removes potentially hazardous obstacles from walkways or access points used by workers in the field.

In some embodiments, additional pumps may be included on the second pump truck. As shown in FIG. 3, a fourth pump 350 is included on the second pump truck 334. The fourth pump 350 includes a fourth fluid outlet 352 configured to output high pressure fluid for delivery to a fourth fluid inlet 354 on the manifold 308 via a fourth flexible pipe 356. The fourth flexible pipe 356 includes a first end 358 and a second end 360 configured to connect to the fourth fluid outlet 352 and the fourth fluid inlet 354, respectively. The portion of the fourth flexible pipe 356 between the first and second ends 358, 360 is self-supporting and does not touch the ground, other equipment, or include any additional external support. In the configuration shown, the fourth fluid outlet 352 on the fourth pump 350 is on the lateral side 362*b* nearest the manifold 308. As such, the fourth flexible pipe 356 does not cross over the second pump truck 334 but does cross over the space 348 between the second pump truck 334 and the manifold 308 similar to the third flexible pipe 342. This example demonstrates that pump trucks may be arranged asymmetrically with respect to the manifold.

While the pumps disposed on the pump trucks are illustrated having outlets on a lateral side of the pump truck, other configurations are possible. For example, pumps may be arranged on the pump truck such that one or more fluid outlets are oriented toward an end of the pump truck. Depending on whether the truck is facing toward or away from the manifold, a self-supporting flexible pipe connecting the fluid outlet at the end of a truck to a fluid inlet of a manifold may form an arch that extends over the truck or over a space between the truck, respectively.

Pump trucks 302, 334 supply fluid to manifold 308. Manifold 308 feeds fluid to a missile 305 where fluid is selectively supplied to the wellbore. Additional pumps and/or pump trucks may be connected to the manifold 308, or to additional manifolds (not shown) that are fluidly connected to the missile 305, to provide additional fluid pumping capacity depending on the needs of the particular oilfield process. In general, the self-supporting flexible pipe arrangement disclosed herein allows for pump truck and pump placement in a variety of configurations relative to the manifold. The flexible pipe can range in length between approximately 10 feet and approximately 30 feet, such as 15 feet to 25 feet in some embodiments. In some examples, the length of the flexible pipe is around 20 feet. Depending upon the size (nominal pipe diameter, for example) and make-up (central conduit thickness, armoring layers, etc.) of the flexible pipe, the self-supporting length may be greater or less than the range noted above.

Figure 8:
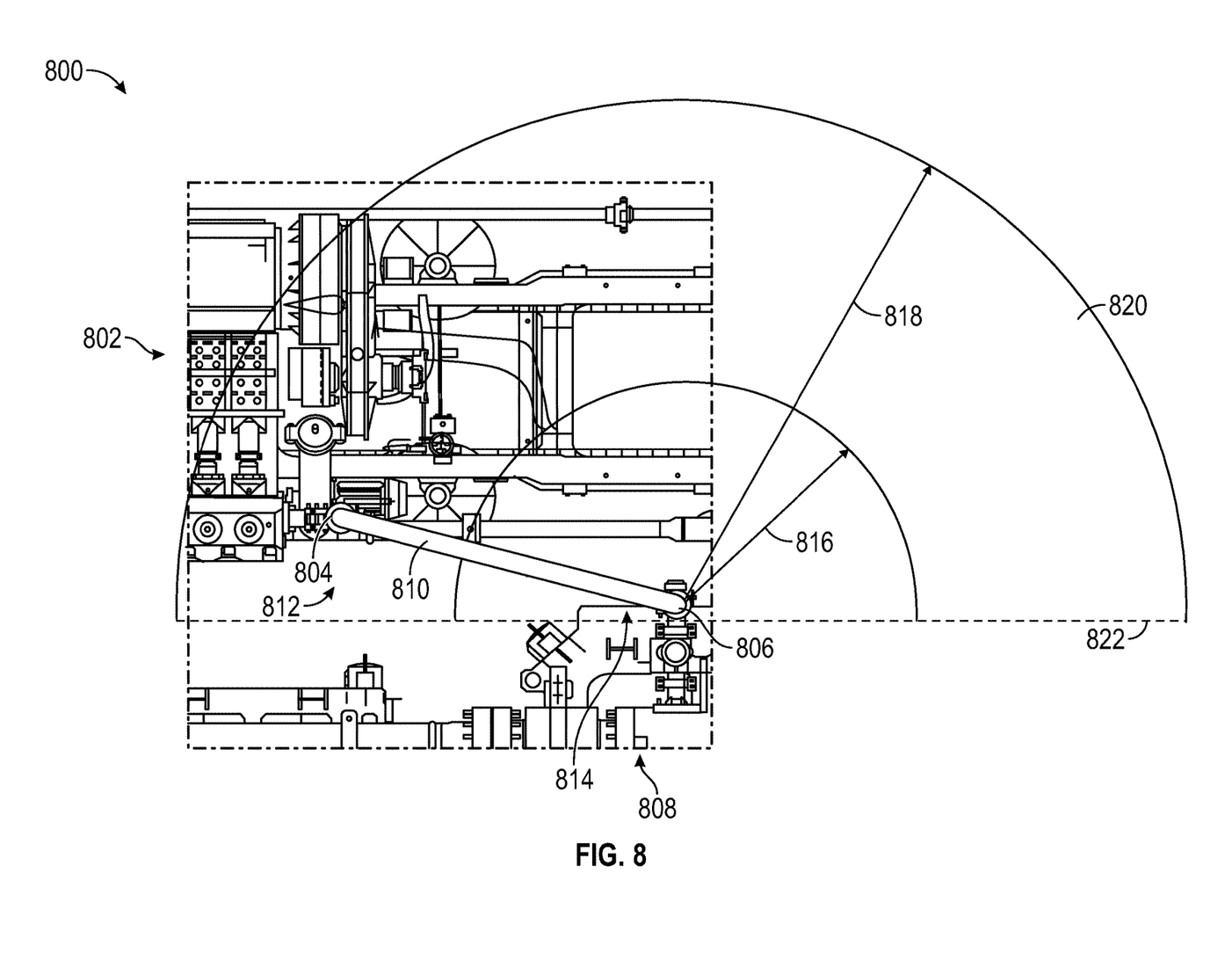

As discussed above, several pumps can be connected to a single manifold. A system using self-supporting flexible pipes to connect pumps to a manifold allows for a wider range of possible pump locations and orientations relative to the manifold. Referring to FIG. 8, a diagram 800 is shown to illustrate possible locations of the pump 802, and more specifically, possible locations of the fluid outlet 804 on the pump 802, relative to a fluid inlet 806 on the manifold 808. A self-supporting flexible pipe 810 includes a first end 812 connected to the fluid outlet 804 and a second end 814 connected to the fluid inlet 806. The two ends 812, 814 of the flexible pipe 810 can be brought closer together by increasing the height of the arch formed therebetween and increasing the amount of curvature in the flexible pipe. Alternatively, the two ends 812, 814 can be spaced further apart by decreasing the height of the arch and causing the arch to become more flat. There exists an inner radius 816 representing an inner limit of the possible locations of fluid outlet 804 for a flexible pipe of given length and material. Bringing the two ends 812, 814 closer than the distance 816 may cause the flexible pipe to crease or otherwise fail. There also exists an outer radius 818 representing an outer limit of the possible locations of fluid outlet 804 for a flexible pipe of given length and material. Extending the two ends 812, 814 beyond the distance 818 may stretch the pipe or flatten the arch to an extent beyond which it is able to support itself. Thus, a range of locations 820 exists for which a fluid outlet position may be accommodated by the flexible pipe 810. The range 820 may be restricted by the location of the manifold itself, represented by line 822.

Figure 9:
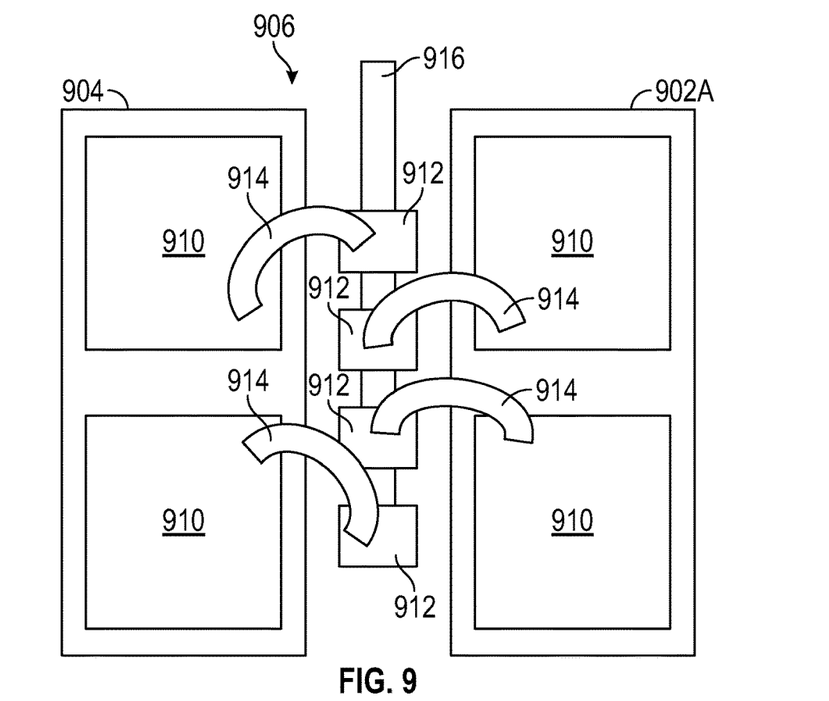
Figure 10:
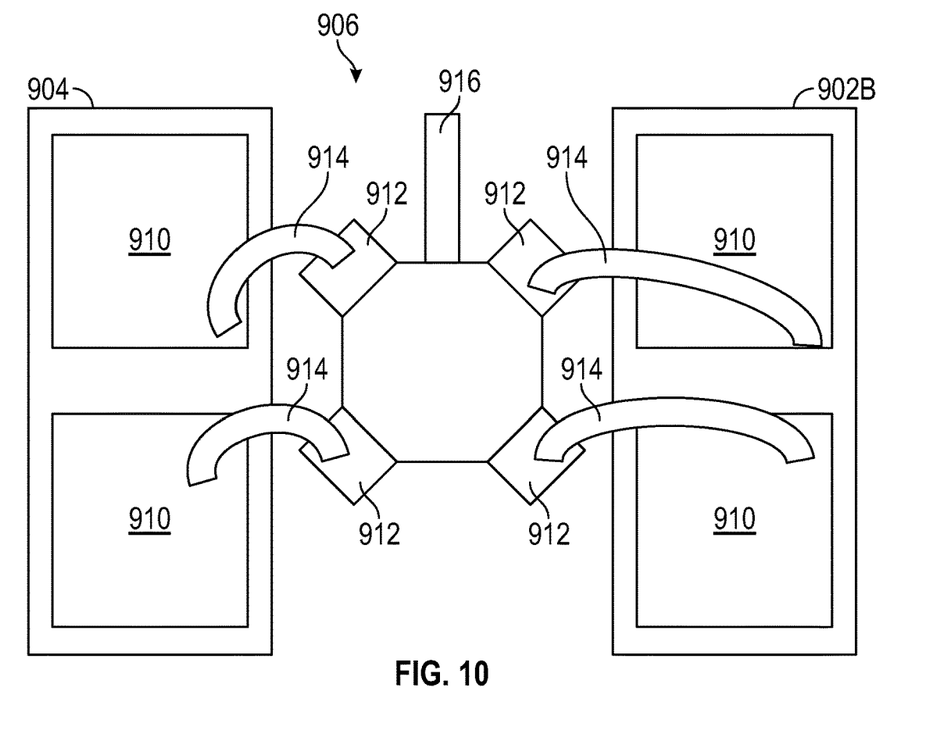

As noted above, the use of arched flexible pipes may provide some flexibility in equipment layout. Various example layouts are illustrated in FIGS. 9 and 10, where like numerals represent like parts. Each layout includes a first pump truck 902A/B and a second pump truck 904 feeding a manifold 906. The manifolds 906 may include inlets 912, which may be arranged in series, as in FIG. 9, in parallel, as in FIG. 10, or a combination thereof. The pump trucks 902A/B may include one, two, or more pumps 910, a fluid outlet of each of which may be connected to a respective inlet 912 of the manifold by an arched flexible pipe 914. The manifold may receive fluid from each of the pumps 910 and may then transport the fluid via a trunkline 916, such as to a larger manifold or a downstream operation. Depending upon the orientation of the trailers and the pumps, the arched flexible pipes may be disposed from the pump over a walkway between the pump trucks 902A, 904 and the manifold 906, or over the pump truck 902B and a walkway, as illustrated in FIG. 10. As the flexible pipes 914 may be disposed over the pump truck itself, the arrangement of the equipment on the pump truck itself may be in essentially any configuration, with the pump being locatable in any portion of the trailer, so long as there is sufficient access to the pump outlet so as to enable forming of the arch with the flexible pipe. In other words, the configuration of the pump truck, location of pumps relative to the manifold, and other variables that would otherwise need to be considered when coordinating arrangement of the pump trucks in the system may be relaxed when arched flexible pipe is used in accordance with embodiments herein.

In addition to providing equipment layout flexibility and reducing tripping hazards by clearing the ground of obstacles, the use of arched and, in some embodiments, self-supporting, flexible pipes also helps to reduce vibrations within the system. The arched flexible pipe is able to move in the air as fluid is pumped therethrough and the motion of the flexible pipe dampens vibrations that would otherwise be transmitted throughout the system by a rigid pipe. This feature may improve reliability of components within the pumping system by reducing vibration-induced stresses. The reduced vibrations may also allow pumps to run at higher revolutions per minute for longer periods of time.

Further advantages of flexible pipe connections are realized due to the smooth arch formed between the two ends. The smooth arch reduces stress concentrations and pipe erosion compared to the many stress concentrations created by various angles and turns required in a rigid pipe connection. The reduced stress and erosion may contribute to better system reliability. Additionally, the smooth arch and lack of angles or redundancies in the connection reduces fluid pressure drop from the pump outlet to the manifold inlet. This is particularly advantageous as it helps deliver high pressure fluid needed for various downhole operations without overworking pump equipment.

As discussed previously, rigid pipes typically include various segments and joints that must be assembled to meet up and connect with a back end of a pump truck where high pressure fluid will be delivered to the pipe from the pump via an intermediate connector on board the pump truck. This assembly process is time consuming, especially when several pump trucks are involved, as shown in FIG. 1. Additionally, because of the spatial constraints of the truck position, rigid pipes are not connected directly to pump outlets. The intermediate connector must transfer fluid from the pump toward the back of the pump truck and connect to the rigid pipe. This additional componentry occupies valuable space on board a pump truck.

In contrast, the arched flexible pipe can be quickly and easily connected to a fluid outlet on a pump using, for example, clamp hub connections. The connectors may be parallel, angled, non-straight, or 90-degree connectors. This significantly reduces set up and assembly time and also allows for more efficient use of space available on a pump truck by eliminating the need for extraneous intermediate connectors or support bracketry for most, and possibly all, embodiments herein. The flexible pipe extends in an upward direction from the fluid outlet on the pump and from the fluid inlet on the manifold, thereby forming an arch shape. While horizontal connectors may be used, angled connectors having an angle greater than 30 degrees from horizontal may reduce strain on the flexible pipe and facilitate forming an arch shape. In some embodiments, the angled connectors may have an angle between 30-45 degrees, 45-60 degrees, or 60-90 degrees from horizontal. As used herein, "horizontal" and "vertical" are relative to the ground, especially that around the location of the pump truck, as would be readily understood by one skilled in the art.

Connecting the arched flexible pipe to a pump and manifold may include steps such as executing a two point lift to pick up the flexible pipe, allowing the flexible pipe to drape downward from the two ends in a downward or upside-down "u" shape, supporting the flexible pipe using a crane and moving the flexible pipe to the installation location. Once the flexible pipe is near the installation location, a first end is manipulated to align with a mounting point on a pump outlet or on an intermediate connector, and the first end is connected with the pump outlet or intermediate connector. A second end of the flexible pipe is manipulated to align with a mounting point on a manifold inlet or an intermediate connector and the second end is connected to the manifold inlet or intermediate connector. Fastening the flexible pipe to the pump, manifold, or intermediate connectors may include fastening a clamp. The intermediate connectors may be straight or angled. At this point, the two ends are lower than the center portion of the flexible pipe so that the flexible pipe is formed into an arch. Manpower may be applied in the alignment and connection of the first and second ends with the pump outlet and manifold inlet, respectively or intermediate connectors therebetween; however, all lifting effort may be provided by the crane. When connected to the inlet and the outlet, the flexible pipe may be self-supporting, and the crane may be disconnected from the flexible pipe.

While various configurations of pumping systems have been described with respect to a limited number of embodiments, those skilled in the art, having benefit of this disclosure, will appreciate that other embodiments can be devised which do not depart from the scope of the present disclosure. Accordingly, the scope of the disclosure should be limited only by the attached claims.

The invention claimed is:

1. A system for transferring fluid, the system comprising:
a manifold having a plurality of fluid inlets;
a first pump truck having a first pump and a second pump disposed thereon, wherein the first pump comprises a first fluid outlet and the second pump comprises a second fluid outlet;
a first flexible pipe configured to couple the first fluid outlet to a first of the plurality of fluid inlets;
a second flexible pipe configured to couple the second fluid outlet to a second of the plurality of fluid inlets, wherein the first and second flexible pipes are self-supporting and form an arch extending over the first pump truck;
a second pump truck having a third pump and a fourth pump disposed thereon, wherein the third pump comprises a third fluid outlet and the fourth pump comprises a fourth fluid outlet;
a third flexible pipe configured to couple the third fluid outlet to a third of the plurality of fluid inlets; and
a fourth flexible pipe configured to couple the fourth fluid outlet to a fourth of the plurality of fluid inlets, wherein the third and fourth flexible pipes are self-supporting and form an arch extending over a space between the second pump truck and the manifold.

2. A system for transferring fluid to a wellbore, the system comprising:
two or more systems for transferring fluid from a pump to a manifold as claimed in claim 1;
a primary manifold fluidly connected to and configured to receive fluid from each of the manifolds of the two or more systems; and
wherein an outlet of the primary manifold is fluidly connected, directly or indirectly, to the wellbore.

3. A system for transferring fluid, the system comprising:
a manifold having a first fluid inlet;
a first pump having a first fluid outlet; and
a first flexible pipe comprising a first end coupled to the first fluid outlet and a second end coupled to the first fluid inlet,
wherein the first flexible pipe extends in an upward direction from the first fluid inlet and from the first fluid outlet or an intermediate connector thereto, and
wherein the first flexible pipe is self-supporting between the first and second ends.

4. The system of claim 3, wherein the first flexible pipe forms a first arch between the first and second ends.

5. The system of claim 3, wherein a length of the first flexible pipe is between about 10 feet and about 30 feet.

6. The system of claim 3, wherein the first pump is disposed on a first pump truck, the first fluid outlet being along a lateral side of the first pump truck.

7. The system of claim 4, wherein the first arch formed by the first flexible pipe extends over the first pump truck.

8. The system of claim 4, further comprising:
a second pump disposed on the first pump truck, the second pump comprising a second fluid outlet; and
a second flexible pipe having a third end coupled to the second fluid outlet and a fourth end coupled to a second fluid inlet on the manifold,
wherein the second flexible pipe is self-supporting and forms a second arch between the third and fourth ends, and
wherein the second arch extends over the first pump truck.

9. The system of claim 8, further comprising:
a third pump disposed on a second pump truck, the third pump comprising a third fluid outlet; and
a third flexible pipe comprising a fifth end coupled to the third fluid outlet and a sixth end coupled to a third fluid inlet of the manifold,
wherein the third flexible pipe is self-supporting and forms a third arch between the fifth and sixth ends, and
wherein the third arch bridges a space between the second pump truck and the manifold.

10. The system of claim 3, wherein the first end of the first flexible pipe is coupled to the first fluid outlet of the first pump with a non-straight connection, and wherein the first end of the first flexible pipe is coupled to the first fluid outlet of the first pump with a clamp configured to prevent swiveling between the first fluid outlet and the first end of the first flexible pipe.

11. A method of assembling a pumping system comprising: locating a first pump truck and a second pump truck proximate a manifold, wherein the first pump truck comprises a first pump disposed thereon and the second pump truck comprises a second pump disposed thereon; connecting a first end of a first flexible pipe to a first fluid inlet of the manifold; connecting a second end of the first flexible pipe to a fluid outlet of the first pump thereby forming the first flexible pipe in a first arch between the first and second ends; connecting a first end of a second flexible pipe to a second fluid inlet of the manifold; and connecting a second end of the second flexible pipe to a fluid outlet of the second pump thereby forming the second flexible pipe in a second arch, wherein at least one of the first arch and the second arch are self-supporting.

12. The method of claim 11, wherein connecting the first end of the first flexible pipe to the first fluid inlet of the manifold comprises fastening the first end of the first flexible pipe to a first connector intermediate the first flexible pipe and the first fluid inlet of the manifold.

13. The method of claim 12, wherein fastening the first end of the first flexible pipe to the first connector comprises fastening a first clamp connection.

14. The method of claim 11, wherein connecting the second end of the first flexible pipe to the first fluid outlet of the first pump comprises fastening the second end of the first flexible pipe to a second connector intermediate the first flexible pipe and the outlet of the first pump.

15. The method of claim 14, wherein fastening the second end of the first flexible pipe to the second connector comprises fastening a second clamp connection.

16. The method of claim 11, wherein the first arch extends upwardly over the first pump truck and wherein the second arch extends upwardly over a space between the second pump truck and the manifold.

17. A system for transferring fluid, the system comprising: a manifold having a plurality of fluid inlets; a first pump truck having a first pump disposed thereon, wherein the first pump comprises a fluid outlet; a flexible pipe fluidly coupled between the fluid outlet and a first of the plurality of fluid inlets, wherein the flexible pipe forms a downward concave arch extending over the first pump truck and/or over a space between the first pump truck and the manifold, wherein each of the flexible pipes forming a downward concave arch are self-supporting.

18. The system of claim 17, the system further comprising:
- a second pump truck having another pump disposed thereon, wherein the another pump comprises a fluid outlet;
- a flexible pipe fluidly coupled between the fluid outlet of the another pump and another of the plurality of fluid inlets, wherein the flexible pipe forms a downward concave arch extending over the second pump truck and/or over a space between the second pump truck and the manifold.

19. The system of claim 17, wherein the first pump truck has the first pump and a second pump disposed thereon, the second pump fluidly connected to another of the plurality of fluid inlets via flexible pipe, wherein the flexible pipe forms an arch extending over the first pump truck and/or over a space between the first pump truck and the manifold.

\* \* \* \* \*